US008382880B2

(12) United States Patent
Schmoll et al.

(10) Patent No.: US 8,382,880 B2
(45) Date of Patent: Feb. 26, 2013

(54) METHOD FOR SOLUBILIZING MOLYBDENUM OXIDE CONCENTRATES

(75) Inventors: Josef Schmoll, Goslar (DE); Brigitte Schimrosczyk, Stapelburg (DE); Gisbert Ebeling, Goslar (DE); Joerg Henze, Langelsheim (DE)

(73) Assignee: H. C. Starck GmbH, Goslar (DE)

( * ) Notice: Subject to any disclaimer, the term of this patent is extended or adjusted under 35 U.S.C. 154(b) by 41 days.

(21) Appl. No.: 12/745,773

(22) PCT Filed: Nov. 4, 2008

(86) PCT No.: PCT/EP2008/064951

§ 371 (c)(1),
(2), (4) Date: Jan. 11, 2011

(87) PCT Pub. No.: WO2009/071409

PCT Pub. Date: Jun. 11, 2009

(65) Prior Publication Data

US 2011/0088513 A1 Apr. 21, 2011

(30) Foreign Application Priority Data

Dec. 4, 2007 (DE) ......................... 10 2007 058 465

(51) Int. Cl.
*C22B 3/12* (2006.01)
*C22B 61/00* (2006.01)

(52) U.S. Cl. ........................................... 75/711; 423/53

(58) Field of Classification Search .................... 75/711; 423/53

See application file for complete search history.

(56) References Cited

U.S. PATENT DOCUMENTS

| | | | |
|---|---|---|---|
| 3,829,550 | A | 8/1974 | Ronzio et al. |
| 3,860,419 | A | 1/1975 | Weber et al. |
| 4,046,852 | A | 9/1977 | Vertes et al. |
| 4,525,331 | A | 6/1985 | Cheresnowsky et al. |
| 4,555,386 | A | 11/1985 | Cheresnowsky |
| 4,596,701 | A | 6/1986 | Cheresnowsky et al. |
| 2005/0019247 | A1 | 1/2005 | Balliett et al. |

FOREIGN PATENT DOCUMENTS

| | | | |
|---|---|---|---|
| DE | 2162065 | A1 | 6/1973 |
| DE | 23 45 673 | A1 | 4/1974 |
| DE | 27 22 615 | A1 | 12/1977 |

OTHER PUBLICATIONS

Dialog English translation of CN 101086034 A, published Jun. 8, 2006.*

International Search Report from PCT/EP2008/064951, mailed on Feb. 5, 2009.

* cited by examiner

*Primary Examiner* — George Wyszomierski
*Assistant Examiner* — Tima M McGuthry Banks
(74) *Attorney, Agent, or Firm* — Norman B. Thot

(57) ABSTRACT

A process for digesting molybdenum oxide concentrates includes suspending a molybdenum-containing starting material in an aqueous solution so as to obtain a suspension. While stirring, an oxidizing agent and an alkali solution of at least one alkali metal are metered to the suspension so as to set a pH and produce a product having a molybdenum content of at least 98% of the molybdenum-containing starting material. The alkali metal is selected from the group consisting of Na, K and Li.

19 Claims, No Drawings

METHOD FOR SOLUBILIZING MOLYBDENUM OXIDE CONCENTRATES

CROSS REFERENCE TO PRIOR APPLICATIONS

This application is a U.S National Phase application under 35 U.S.C. §371 of International Application No. PCT/EP2008/064951, filed on Nov. 4, 2008 and which claims benefit to German Patent Application No. 10 2007 058 465.4, filed on Dec. 4, 2007. The International Application was published in German on Jun. 11, 2009 as WO 2009/071409 A1 under PCT Article 21(2).

FIELD

The present invention relates to a process for digesting sparingly soluble molybdenum oxide concentrates and oxidizing conditions in basic media.

BACKGROUND

The prior art describes various molybdenum-containing raw materials. They differ only slightly in the molybdenum content and the gangue composition. However, the mass ratio of the molybdenum oxides is very different. There are molybdenum raw material qualities which contain up to 50% molybdenum dioxide ($MoO_2$) and other sparingly soluble molybdenum suboxides, such as $Mo_4O_{11}$. These raw materials are to date used predominantly in the steel industry since the hydrometallurgical conversion of such molybdenum raw materials into high-quality molybdenum compounds and finally into molybdenum metal is not economically viable.

In the production of molybdenum and molybdenum compounds in the chemical industry, only those raw materials which have a very high molybdenum trioxide content ($MoO_3$) and which are very readily soluble in aqueous media are currently used. In view of increasingly scarce high-quality raw materials and increasing raw material prices, any possibility of using alternative raw materials for molybdenum extraction which have an economic advantage should be investigated.

In most cases, molybdenite ($MoS_2$) serves as a molybdenum source. Molybdenite is usually converted into molybdenum oxide by roasting under oxidizing conditions. The molybdenum oxides thus obtained, also referred to as technical molybdenum oxides, are then digested by known processes.

DE 2162065 describes a process for purifying and digesting roasted molybdenum concentrates, also referred to below as technical molybdenum oxides. The technical molybdenum oxide is treated with a nitric acid which contains ammonium nitrate ($NH_4OH$). The content of free nitric acid results in a sufficient decrease in the impurities and the further digestion of the Mo compounds, so that, on subsequent dissolution in $NH_4OH$ or NaOH, a comparatively smaller amount of residue on dissolution having a comparatively lower molybdenum content is obtained than on dissolution of untreated molybdenum concentrate.

U.S. Pat. No. 4,525,331 describes using a nitric acid ($HNO_3$) excess to firstly achieve better solubility of the impurities and secondly to oxidize residues of Mo(IV) into Mo(VI). The solid is then dissolved in $NH_4OH$.

U.S. Pat. No. 4,596,701 describes digesting the molybdenum oxides with an aqueous solution of sulphuric acid, ammonium sulphate and ammonium peroxodisulphate in order better to dissolve the impurities. Furthermore, the peroxodisulphate also oxidizes Mo(IV) still present to Mo(VI), so that a better molybdenum yield is achieved in the subsequent dissolution step with $NH_4OH$.

U.S. Pat. No. 4,046,852 describes another process for preparing high-purity alkali metal molybdate which involves mixing the roasted molybdenum concentrate in a first step with mineral acids, the mineral acids being used in a stoichiometric excess, based on the impurities. In a second step, the suspension thus formed is treated in an autoclave at between 150° C. and 350° C. in the presence of free oxygen, impurities going into solution and Mo suboxides being converted into $MoO_3$. In the third step, the solid separated off is dissolved in alkali metal hydroxide.

DE 2345673 describes a process for the preparation of high-purity molybdenum oxide and ammonium molybdate, the molybdenum oxide concentrate first being treated with an aqueous ammonium hydroxide solution for producing a suspension. The suspension thus obtained is then digested in the presence of free oxygen which is sufficient to convert the predominant proportion of the molybdenum oxides into soluble ammonium molybdate compounds. The residue, which still has proportions of molybdenum, is again leached with an aqueous alkaline solution which contains sodium hypochloride, at pH 9 to pH 10, in order to dissolve the remaining proportions of molybdenum.

In the abovementioned processes, separating off the impurities on digestion of the roasted molybdenum concentrate is of primary importance. Excessive reagent or addition of oxidizing agents relates primarily to the amount of impurities detected in the molybdenum oxide. The increase in the Mo dissolution yield on digestion of molybdenum concentrate by oxidation of the Mo suboxides during the digestion process is mentioned as a side effect. Molybdenum suboxide is oxidized to $MoO_3$ only in an amount which corresponds to the stoichiometry of the amount of oxidizing agent used.

With the use of free oxygen as an oxidizing agent, an autoclave is employed at at least 150° C. and a pressure of about 7 bar. In the case of digestion of molybdenum concentrates with $NH_4OH$ at atmospheric pressure in the presence of free oxygen, it is necessary to employ a plurality of steps in order to achieve a satisfactory molybdenum yield.

In all the abovementioned processes, starting materials are used which either contain a very high proportion of molybdenum trioxide ($MoO_3$) soluble in aqueous media or which consist exclusively of a contaminated molybdenum trioxide.

SUMMARY

An aspect of the present invention is to provide an economical process which makes it possible to digest molybdenum oxide concentrates having a high proportion of sparingly soluble molybdenum oxides of up to 50% or more in a one-stage process with yields greater than 98%.

In an embodiment, the present invention provides a process for digesting molybdenum oxide concentrates which includes suspending a molybdenum-containing starting material in an aqueous solution so as to obtain a suspension. While stirring, an oxidizing agent and an alkali solution of at least one alkali metal are metered to the suspension so as to set a pH and produce a product having a molybdenum content of at least 98% of the molybdenum-containing starting material. The alkali metal is selected from the group consisting of Na, K and Li.

DETAILED DESCRIPTION

The present invention is based on the surprising discovery that the sparingly soluble molybdenum oxide concentrates are virtually completely digested in aqueous suspension with hydroxides of the alkali metals (alkali solution) with simultaneous introduction of an oxidizing agent.

Technical molybdenum oxide is a mixture consisting of $MoO_3$ and sparingly soluble $MoO_2$ and $Mo_4O_{11}$, with the proportion of $MoO_2$ and $Mo_4O_{11}$ being 2 to 65% by weight. The technical molybdenum oxide usually contains up to 50% by weight of sparingly soluble molybdenum oxides. The technical molybdenum oxides may contain up to 40, 30 or up to 20% by weight of the sparingly soluble molybdenum oxides.

In the process according to the present invention, the molybdenum oxide concentrates are first suspended in water, for example, in demineralized water. Thereafter, an alkali solution having a concentration of up to 50% by weight, for example, up to 45% by weight, or up to 40% by weight, is added until a desired pH is established and simultaneously, with stiffing, an oxidizing agent is introduced so that a homogeneous distribution is obtained in the entire reaction space.

The process according to the present invention can be carried out in stirred reactors known from the prior art. The flow conditions should be adjusted so that an optimum distribution of the oxidizing agent in the suspension in the reactor is obtained. The oxidizing agent can be metered in at any point of the reactor, for example, directly below the stirring member. All customary stirrer types (paddle stirrer, disc stirrer, propeller stiffer) can be used for achieving a homogeneously mixed reaction zone in the reactor. The stirring speed may be up to 3000 rpm, for example, up to 2000 rpm. Good results are obtained with the use of a disc stirrer at a stiffing speed of up to 1000 rpm. The process according to the present invention can be operated discontinuously (batchwise) or continuously. In an embodiment of the present invention, the process according to the present invention is carried out so that gases from the group consisting of air, oxygen, ozone and/or mixtures thereof are used as oxidizing agents. The gaseous oxidizing agents can be introduced into the reactor at any point, such as below the stirring member.

Good digestion results can be obtained if a microfine distribution of the small gas bubbles in the suspension is present. This can be achieved by the use of a paddle stirrer, for example, phase jets from Ekato. In this embodiment of the present invention, an Mo yield of 98% can be achieved after a duration of reaction of at least 6 hours at a pH of 9. At a pH of $\leqq$12, the duration of the reaction decreases to $\leqq$3 h. Liquid compounds, such as hydrogen peroxide, peroxodisulphates of the alkali metals and/or mixtures thereof can also be used as oxidizing agents. The process according to the present invention can, for example, be carried out so that the amount of oxidizing agent added is at least the stoichiometric amount, based on the $MoO_3$. The amount of oxidizing agent can, for example, be at least a majority of the stoichiometric amount, based on $MoO_3$.

The stoichiometric amount may be at least two-fold, for example, at least three-fold.

A desired pH can be established in the reaction zone of the reactor, depending on the content of sparingly soluble molybdenum oxides in the molybdenum oxide concentrate. The pH can, for example, be at least 8, such as at least 10, or at least 11.

The digestion of the molybdenum oxide concentrates in the suspension can be effected at temperatures which are sufficient to convert the sparingly soluble molybdenum oxides into $MoO_3$ and subsequently into a molybdate, for example, sodium molybdate. The temperature can, for example, be at least 30° C., such as at least 50° C., or at least 60° C. In an embodiment of the process of the present invention, the temperature can be at least 70° C. The highest digestion rate is achieved if the temperature is at least 80° C., for example at least 90° C. The molybdenum-containing products obtainable after the digestion are converted by known processes into end products, such as into molybdic acid, molybdenum metal or molybdenum salts.

The present invention is further explained by the following examples.

EXAMPLES

Example 1

2.1 liters of demineralized water were introduced into a heatable 4 liter stirred reactor. 1790 g of technical molybdenum oxide having an Mo content of 62% and a proportion of $MoO_3$ of 60% were added with stirring so that a homogeneous suspension was formed. The reactor cover with aeration tube was placed on top. Oxygen was introduced into the stirred reactor via a lateral inlet tube at a volume flow rate of 100 l/h (liter/hour). The oxygen feed was effected directly below the stirring member in order to obtain a good distribution of the small oxygen bubbles in the suspension. The stirring member was equipped with a paddle stirrer. The stirring speed was 1675 rpm. Thereafter, NaOH was passed in via a pump having a measuring and control unit continuously until a stable pH of 9.0 was reached. The suspension was heated via a double jacket with external heating circulation. The temperature control was effected via a PT 100 with control relay. The temperature was kept constant at 90° C. over the entire duration of the digestion process. After a duration of reaction of 6.5 hours, the reactor was emptied. The suspension was then filtered via a suction filter. The filter cake was washed with demineralized water so that no mother liquor remained in the filter cake. The filtered mother liquor was further processed to molybdenum compounds according to the known prior art.

The molybdenum content in the dried filter cake was 11%, which corresponded to a molybdenum yield of 98%.

Example 2

The experimental procedure was as described in Example 1 with NaOH being fed in until a stable pH of 12 was reached. After a duration of reaction of 3.5 h, the molybdenum content in the dried filter cake was 7%, which corresponded to a molybdenum yield of 99%.

Example 3

The experimental procedure was as described in Example 1 with air being passed in instead of oxygen. After a duration of reaction of 9 h, the molybdenum content in the dried filter cake was 10%, which corresponded to a molybdenum yield of 98%.

Example 4

0.6 liter of demineralized water was introduced into a heatable stainless steel pot having an effective volume of 2 liters and a total volume of 4 liters. 480 g of technical molybdenum oxide having an Mo content of 62% with a proportion of MoO3 of 60% were added with stirring so that a homogeneous suspension formed. 400 ml of 50% strength NaOH were added to this suspension until a pH of 11 was reached. Air was passed into the stirred reactor via a lateral inlet tube at a volume flow rate of 350 l/h. The air feed was effected directly below the stirring member in order to obtain a good distribution of the small air bubbles in the suspension. The stirring member used was a disc stirrer. The stirring speed was 1000 rpm. In order to avoid concentration changes, the apparatus was operated under reflux. The heating was effected by means of external heating bands. The suspension was heated to 90° C. The temperature control was effected via a PT 100 with control relay. The amount of air was determined via a variable area flow meter (Rotameter). After a duration of reaction of 5 h, the molybdenum content in the dried filter cake was 3%, which corresponded to a molybdenum yield of >99.5%.

Example 5

0.6 liter of demineralized water was introduced into a heatable stainless steel pot having an effective volume of 2 liters and a total volume of 4 liters. 480 g of technical molybdenum oxide having an Mo content of 62% with a proportion of molybdenum in the form of $MoO_3$ of 89% were added with stirring so that a homogeneous suspension was formed. 50% strength NaOH was added to this suspension with stirring until a pH of 9.5 was established. The suspension was heated to 95° C. Thereafter, 150 g of 30% strength $H_2O_2$ solution were metered in over a period of 1 h. The pH of 9.5 was kept constant during this time by further addition of NaOH.

The $H_2O_2$ feed was effected directly below the stirring member in order to obtain good distribution in the suspension. The stirring member used was a disc stirrer. The stirring speed was 1000 rpm. In order to avoid concentration changes, the apparatus was operated under reflux. The heating was effected by means of external heating bands. The temperature control was effected via a PT 100 with control relay. After the duration of reaction of 1 h, the Mo content in the dried filter cake was 7%, which corresponded to an Mo yield of 98%.

The present invention is not limited to embodiments described herein; reference should be had to the appended claims.

The invention claimed is:

1. A method for digesting molybdenum oxide concentrates, the method comprising:
- suspending a molybdenum-containing starting material in an aqueous solution so as to obtain a suspension;
- metering to the suspension, while stirring, an oxidizing agent and an alkali solution of at least one alkali metal so as to set a pH and produce a product having a molybdenum content of at least 98% of the molybdenum-containing starting material, wherein,
- the alkali metal is selected from the group consisting of Na, K and Li,
- the molybdenum-containing starting material includes molybdenum (III) oxide, and
- the oxidizing agent is added in an amount which is at least a stoichiometric amount of the molybdenum (III) oxide.

2. The method as recited in claim 1, wherein the oxidizing agent is a gas comprising at least one of air, oxygen and ozone.

3. The method as recited in claim 1, wherein the oxidizing agent is a liquid comprising at least one of hydrogen peroxide and peroxide sulfates of the alkali metals.

4. The method as recited in claim 1, wherein the molybdenum starting material includes molybdenum (III) oxide and the oxidizing agent is added in an amount which is at least a multiple of a stoichiometric amount of the molybdenum (III) oxide.

5. The method as recited in claim 1, wherein the set pH of the suspension is at least 8.

6. The method as recited in claim 1, wherein the set pH of the suspension is at least 11.

7. The method as recited in claim 1, further comprising heating the suspension to a temperature of at least 50° C.

8. The method as recited in claim 1, further comprising heating the suspension to a temperature of at least 80° C.

9. The method as recited in claim 1, further comprising heating the suspension to a temperature of at least 90° C.

10. A method for digesting molybdenum oxide concentrates, the method comprising:
- suspending a molybdenum-containing starting material comprising molybdenum (III) oxide in an aqueous solution so as to obtain a suspension;
- metering to the suspension, while stirring, an oxidizing agent and an alkali solution of at least one alkali metal so as to set a pH and produce a product having a molybdenum content of at least 98% of the molybdenum-containing starting material, wherein the alkali metal is selected from the group consisting of Na, K and Li.

11. The method as recited in claim 10, wherein the oxidizing agent is a gas comprising at least one of air, oxygen and ozone.

12. The method as recited in claim 10, wherein the oxidizing agent is a liquid comprising at least one of hydrogen peroxide and peroxide sulfates of the alkali metals.

13. The method as recited in claim 10, wherein the oxidizing agent is added in an amount which is at least a stoichiometric amount of the molybdenum (III) oxide.

14. The method as recited in claim 10, wherein the oxidizing agent is added in an amount which is at least a multiple of a stoichiometric amount of the molybdenum (III) oxide.

15. The method as recited in claim 10, wherein the set pH of the suspension is at least 8.

16. The method as recited in claim 10, wherein the set pH of the suspension is at least 11.

17. The method as recited in claim 10, further comprising heating the suspension to a temperature of at least 50° C.

18. The method as recited in claim 10, further comprising heating the suspension to a temperature of at least 80° C.

19. The method as recited in claim 10, further comprising heating the suspension to a temperature of at least 90° C.

* * * * *